US011190504B1

(12) United States Patent
Ah Kun et al.

(10) Patent No.: US 11,190,504 B1
(45) Date of Patent: Nov. 30, 2021

(54) CERTIFICATE-BASED SERVICE AUTHORIZATION

(71) Applicant: Amazon Technologies, Inc., Seattle, WA (US)

(72) Inventors: Malcolm Russell Ah Kun, Kirkland, WA (US); Uday Bheema, Bellevue, WA (US); Ankur Goyal, Kirkland, WA (US); Chao Li, Seattle, WA (US); Alexey A. Nikitin, Seattle, WA (US); Himesh Pandya, Seattle, WA (US); Prasanna Subash, Kenmore, WA (US); Zhenghong Sun, Seattle, WA (US); Nathan Bartholomew Thomas, Bellevue, WA (US); Harshit Kumar Tiwari, Seattle, WA (US); Venkatesh Velaga, Redmond, WA (US); Lihao Wang, Seattle, WA (US); Brian Scott Waters, Renton, WA (US); Jeffery David Wells, Redmond, WA (US); Anand Krishnamoorthy, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 129 days.

(21) Appl. No.: 15/598,185

(22) Filed: May 17, 2017

(51) Int. Cl.
*H04L 29/06* (2006.01)
*H04L 9/32* (2006.01)

(52) U.S. Cl.
CPC ........ *H04L 63/0823* (2013.01); *H04L 9/3247* (2013.01); *H04L 9/3268* (2013.01);
(Continued)

(58) Field of Classification Search
CPC . H04L 63/0823; H04L 63/10; H04L 63/0435; H04L 63/0442; H04L 9/3247; H04L 9/3568; H04L 9/3271
(Continued)

(56) References Cited

U.S. PATENT DOCUMENTS

| 6,754,829 B1 * | 6/2004 | Butt | G06F 21/33 |
| | | | 713/175 |
| 7,059,516 B2 * | 6/2006 | Matsuyama | G07C 9/23 |
| | | | 235/382 |

(Continued)

OTHER PUBLICATIONS

Dang, Q., "Recommendation for Applications Using Approved Hash Algorithms," National Institute of Standards and Technology (NIST) Special Publication 800-107 Revision 1, U.S. Department of Commerce, Aug. 2012, 25 pages.
(Continued)

*Primary Examiner* — Samson B Lemma
*Assistant Examiner* — Abdullah Almamun
(74) *Attorney, Agent, or Firm* — Davis Wright Tremaine LLP

(57) ABSTRACT

A computer server controls access to a hosted service using digital certificates that are requested from each client attempting to access the service. When a particular client accesses the hosted service, the host service requests a digital certificate from the particular client and issues a challenge message. The particular client signs the challenge message and provides a client digital certificate to the hosted service. The hosted service confirms that the signature on the challenge message matches the client digital certificate, and that the client digital certificate is signed by a trusted entity. Trusted entities are defined by an administrator by uploading, to the hosted service, one or more trusted digital certificates associated with a trusted entities. Using the trusted digital certificates, the hosted service confirms that
(Continued)

the digital certificate provided by the particular client is signed by at least one of the trusted entities.

20 Claims, 11 Drawing Sheets

(52) U.S. Cl.
CPC ........ *H04L 9/3271* (2013.01); *H04L 63/0435* (2013.01); *H04L 63/0442* (2013.01); *H04L 63/10* (2013.01)

(58) Field of Classification Search
USPC .......................................................... 713/158
See application file for complete search history.

(56) References Cited

U.S. PATENT DOCUMENTS

| | | | | |
|---|---|---|---|---|
| 8,195,934 | B1* | 6/2012 | Lawrence | H04L 63/0823 |
| | | | | 713/156 |
| 8,606,910 | B2* | 12/2013 | Alperovitch | H04L 45/02 |
| | | | | 709/217 |
| 9,237,021 | B2* | 1/2016 | Mills | H04L 9/3263 |
| 9,325,697 | B2* | 4/2016 | Datta | H04L 63/0823 |
| 9,332,002 | B1* | 5/2016 | Bowen | H04L 63/0823 |
| 10,454,689 | B1* | 10/2019 | Mehr | H04L 63/166 |
| 2005/0069136 | A1* | 3/2005 | Thornton | H04L 63/0823 |
| | | | | 380/277 |
| 2008/0260156 | A1* | 10/2008 | Baba | G06F 11/1464 |
| | | | | 380/277 |
| 2013/0067552 | A1* | 3/2013 | Hawkes | H04L 63/0869 |
| | | | | 726/7 |
| 2016/0080157 | A1* | 3/2016 | Lundstrom | H04L 63/126 |
| | | | | 713/176 |
| 2016/0127904 | A1* | 5/2016 | Ward | H04L 63/0442 |
| | | | | 713/176 |
| 2016/0381022 | A1* | 12/2016 | Jackson | H04L 63/083 |
| | | | | 726/7 |
| 2017/0006033 | A1* | 1/2017 | Stecher | H04L 63/10 |
| 2017/0264613 | A1* | 9/2017 | Phillips | H04L 63/0428 |
| 2018/0007059 | A1* | 1/2018 | Innes | G06F 21/33 |
| 2018/0262346 | A1* | 9/2018 | Levy | H04L 9/006 |
| 2018/0324172 | A1* | 11/2018 | Unnikrishnan | H04L 63/0815 |

OTHER PUBLICATIONS

Rutenberg, G., "Securing Access Using TLS/SSL Client Certificate," <https://www.guyretenberg.com/2015/09/15/securing-access-using-tlsssl-client-certificates/> [retrieved May 16, 2017], 6 pages.
"TLS Client Authentication," BrowserAuth.net, <http://www.browserauth.net/tls-client-authentication> [retrieved May 16, 2017], 2 pages.
"Transport Layer Security," Wikipedia, The Free Encylopedia, May 10, 2017, <https://en.wikipedia.org/wiki/Transport_Layer_Security> [retrieved May 16, 2017], 29 pages.

* cited by examiner

CERTIFICATE-BASED SERVICE AUTHORIZATION

BACKGROUND

Web services are an important part of many computing systems. Businesses often combine Web services provided by many different service providers to support the computing needs of a business. For example, a business may use an online storage service, a Web-based computing service, and an online database to provide computing resources for use by their employees. When using Web services provided by third parties, it is important for the service provider to provide adequate security features so that each particular customer is able to control access to their business resources.

BRIEF DESCRIPTION OF THE DRAWINGS

Various techniques will be described with reference to the drawings, in which.

DETAILED DESCRIPTION

Figure 1:
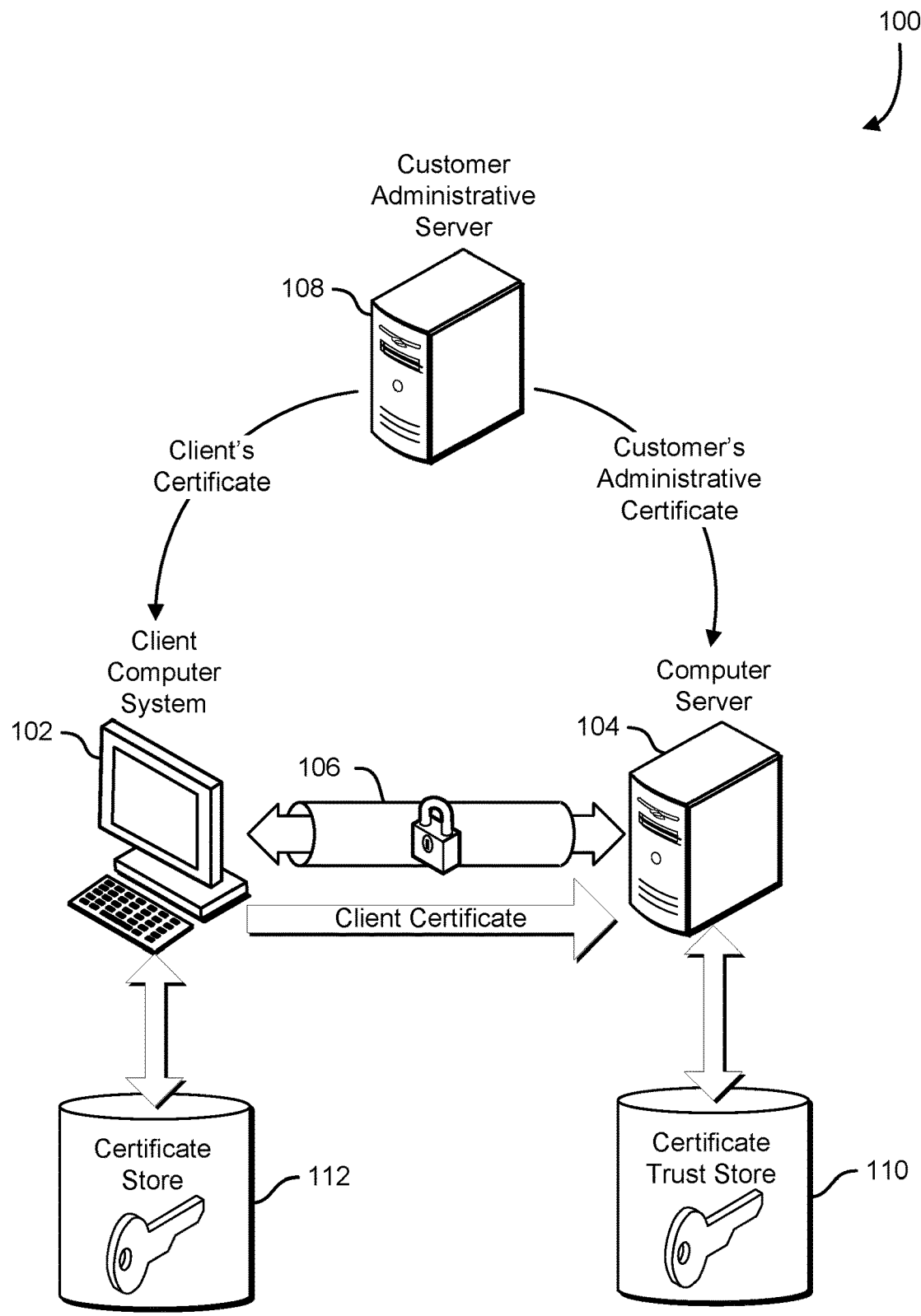
FIG. 1 shows an illustrative example of a system in which various embodiments may be practiced, according to one embodiment.

The present document describes a system that controls client access to a service using digital certificates. A customer administrator opens an account with the service provider. The service provider provides a service that is accessible to a set of client computer systems which are managed by a customer administrator. In various examples, the service may be a web-based service such as an online storage service, online computing service, or virtual desktop service. The administrator uploads, to the service provider, one or more trusted digital certificates associated with one or more trusted entities. In some examples, the administrator uploads a trusted digital certificate that has been issued to the customer by a certificate authority. In another example, the administrator uploads a trusted digital certificate that has been self-signed by the customer. In general, the customer administrator has access to the private keys associated with the trusted digital certificates.

Each client in the set of computer systems managed by the computer administrator acquires a client digital certificate, and has the client digital certificate signed using at least one of the trusted digital certificates uploaded to the service provider. In some implementations, each client generates a client digital certificate and submits the unsigned client digital certificate to the customer administrator for signature. The customer administrator reviews the information in the unsigned client certificate and, upon verification of the information, generates a digital signature for the client certificate using a private key associated with one of the trusted digital certificates uploaded to the service provider. In another implementation, the computer administrator generates a client digital certificate for each client computer system and signs each client digital certificate with a private key associated with at least one of the trusted digital certificates. The signed client digital certificates are uploaded by the customer administrator to the client computer systems.

When a client computer system accesses the service provided by the computer service provider, the client computer system provides the client's certificate as part of the authorization process. In some implementations, the client computer system requests access to the service, and the service responds with a challenge message. The client computer system receives the challenge message and uses the private key associated with the client's digital certificate to generate a digital signature for the challenge message. The client sends the digital signature and the client's digital certificate to the service. The service uses the client's digital certificate to verify that the digital signature on the challenge message is correct. If the digital signature on the challenge message is not correct, the client is denied access to the service. The service confirms that the client's digital certificate is signed using a cryptographic key associated with at least one of the trusted digital certificates uploaded by the customer administrator. If the client's digital certificate is not signed using a cryptographic key associated with at least one of the trusted digital certificates, the service denies access to the client. If the client's digital certificate is signed using a cryptographic key associated with at least one trusted digital certificate, the client is allowed to access the service.

In some examples, under certain conditions, a trusted digital certificate may become expired and be removed from a trust store by the service, rendering the trusted digital certificate unavailable for use in verifying client certificates. In one implementation, when a trusted digital certificate is within a threshold number of days of expiration but not yet expired, the service notifies the clients and the customer administrator that the trusted digital certificate is about to expire. When a trusted digital certificate expires, the trusted digital certificate may be removed from the trust store maintained by the service without intervention from the customer administrator.

In some implementations, an expired trusted digital certificate may continue to be used for verifying client certificates. In one example, the service determines a number of client computer systems that are using a particular expired trusted digital certificate. In some implementations, the number of client computer systems may be determined by determining the number of times the trusted digital certificate is used within a previous amount of time (for example, the last three days). In another implementation, the number of client computer systems may be determined by counting the number of client computer systems using a client digital certificate that is signed by the expired trusted digital certificate. If the number of client computer systems is greater than a threshold value, the service may continue to use the expired trusted digital certificate until the number of client computer systems falls below the threshold value.

In yet another implementation, the service maintains a list of client digital certificates that have been previously used to access the service. If a client computer system submits a client digital certificate that has been previously used to access the service successfully, and the client digital certificate is signed with a trusted digital certificate that is expired, the client digital certificate is accepted by the service and the client is allowed to access the service. Client digital certificates that have not been previously presented and accepted by the service are not accepted when signed by an expired trusted digital certificate.

In some examples, the customer administrator may issue a command to the service that causes the service to revoke one or more client digital certificates. The service maintains a list of revoked client digital certificates. When the customer administrator issues a command to revoke a particular client digital certificate, the particular client digital certificate is added to the list of revoked client digital certificates. When a client submits a digital certificate for use in authorizing access to the service, the service checks to see if the digital certificate is in the list of revoked client digital certificates. If the digital certificate is in the list of revoked client digital certificates, the client is denied access to the service. The customer administrator may revoke a certificate as a result of determining that a particular digital certificate is compromised or no longer in use.

In some examples, the service is an online computing service that provides virtual desktop services to a business, and an administrator associated with the business maintains an account with the service. The administrator generates administrative certificate which is uploaded to the service, and distributes a client certificate (signed with the administrative certificate) to each client computer system in the business that uses the virtual desktop service. If a user's credentials become compromised or stolen, an attacker may be prevented from accessing the virtual desktop service because they do not have the required client certificate (signed with the administrative certificate). In some implementations, the service confirms that the client certificate matches the identity of the client based on connection information derived during the clients attempt to access the service. In such situations, even compromising the client certificate will not allow an attacker to access the service. In the event that a particular client device is lost, stolen, or otherwise compromised, the administrator may revoke the client certificate by adding the client certificate to a revocation list maintained by the service, thereby preventing the compromise device from accessing the service. In addition, the administrator has the option of revoking all client certificate signed with the present administrative certificate by removing the administrative certificate from the online computing service, and replacing the present administrative certificate with a new administrative certificate.

FIG. 1 shows an illustrative example of a system in which various embodiments may be practiced, according to one embodiment. A system diagram 100 shows a client computer system 102 that accesses a service hosted by computer server 104 via a network connection 106. In various examples, the service may be an online storage service, a web-based computing service, the messaging service, a cryptography service, virtual desktop service, or other service. The computer server 104 may be a server, server cluster, virtual machine, network appliance, container runtime, or on-demand computing service. The client computer system 102 may be a personal computer, laptop computer, mobile device, cell phone, tablet computer, a wearable device, network-connected appliance, or other network-connected device. In some examples, the network connection 106 is a wired connection such as an Ethernet connection, fiber-optic connection, or serial bus connection. In other examples, the network connection 106 is a wireless connection such as a Bluetooth connection, a Wi-Fi connection, a cellular connection, or an infrared connection. The client computer system 102 and the computer server 104 may implement a variety of network protocols such as transmission control protocol/Internet protocol ("TCP/IP") or, for protected communications, transport layer security protocol ("TLS").

In some examples, the client computer system 102 is one of many devices administered by an administrator of a customer of an online service provider, and the online service provider operates the computer server 104. An administrator of the customer manages various digital certificates that are distributed to the client computer system 102, who may be managed on behalf of the customer, and the computer server 104 using an administrative server 108. The administrative server may be a personal computer or other computing device running an administrative console. In some implementations, the administrative console is implemented using a web browser. Using the administrative server 108, the administrator uploads an administrative certificate to the computer server 104, such as the online service provider. The administrator certificate includes a public key and is associated with the private key controlled by the customer. In some examples, the administrator certificate is signed by a trusted third party such as a certificate authority ("CA"). After receiving the administrative certificate from the administrative server 108, the computer server 104 stores the administrative certificate in a certificate trust store 110. The certificate trust store 110 is a database, data store, or other data structure implemented on a storage device that is accessible to the computer server 104. The computer server 104 stores the administrative certificate in association with information that identifies the customer's service provider account.

The client computer system 102 acquires a client certificate. In some implementations, the client computer system 102 generates a random public/private key pair, and then generates an unsigned digital certificate containing information that identifies the client computer system and the public key. The client computer system 102 retains the private key that corresponds to the public key. The unsigned client certificate is submitted to the administrative server 108 for approval by the administrator. If the administrator approves of the information in the client certificate, the administrator uses the private key associated with the administrative certificate to apply a signature to the client certificate. The administrative server 108 returns the signed client certificate to the client computer system 102. The client computer system 102 retains the signed client certificate in a certificate store 112. The certificate store 112 is a database, data store, or other data structure, retained on a storage device accessible to the client computer system 102.

When the client computer system 102 requests access to the service provided by the computer server 104, the computer server 104 issues a challenge message to the client computer system 102. In various implementations, the challenge message may be a randomly generated number, byte sequence, nonce, or pseudorandom data. In response to the challenge message, the client computer system 102 generates a digital signature of at least the challenge message using the private key of the client computer system 102. The digital signature and the client digital certificate (that includes the corresponding public key) are returned to the computer server 104. The computer server 104 uses the public key in the client digital certificate to verify the signature of the challenge message. If the signature of the challenge message is incorrect, the client computer system 102 is not allowed to access the service provided by the computer server 104. The computer server 104 examines the client digital certificate and determines whether the client digital certificate is signed using a private key associated with the administrative certificate. If the client digital certificate is signed using the private key associated with the administrative certificate, the client computer system 102 determines that the client certificate is properly signed. In some implementations, the administrator uploads more than one administrative certificate to the computer server 104, and the computer server 104 maintains a collection of customer digital certificates in the certificate trust 110. In such implementations, if the client certificate is signed using a private key associated with any of the customer digital certificates, the computer server 104 determines that the client certificate is properly signed. If the client digital certificate is not properly signed, the client computer system 102 is not allowed to access the service provided by the computer server 104.

In some implementations, the network connection 106 is a TLS or other encrypted network connection, and after establishing the connection, the client computer system 102 provides the client digital certificate to the computer server 104 over the established network connection. In one example, the client digital certificate is sent to the computer system 104 over a record protocol of the encrypted network connection, using a session key established as part of a handshake protocol, such as a TLS handshake.

In various implementations, the computer server 104 may perform various functions related to the management of the customer digital certificates such as managing the expiration of customer digital certificates and the revocation of client digital certificates.

Figure 2:
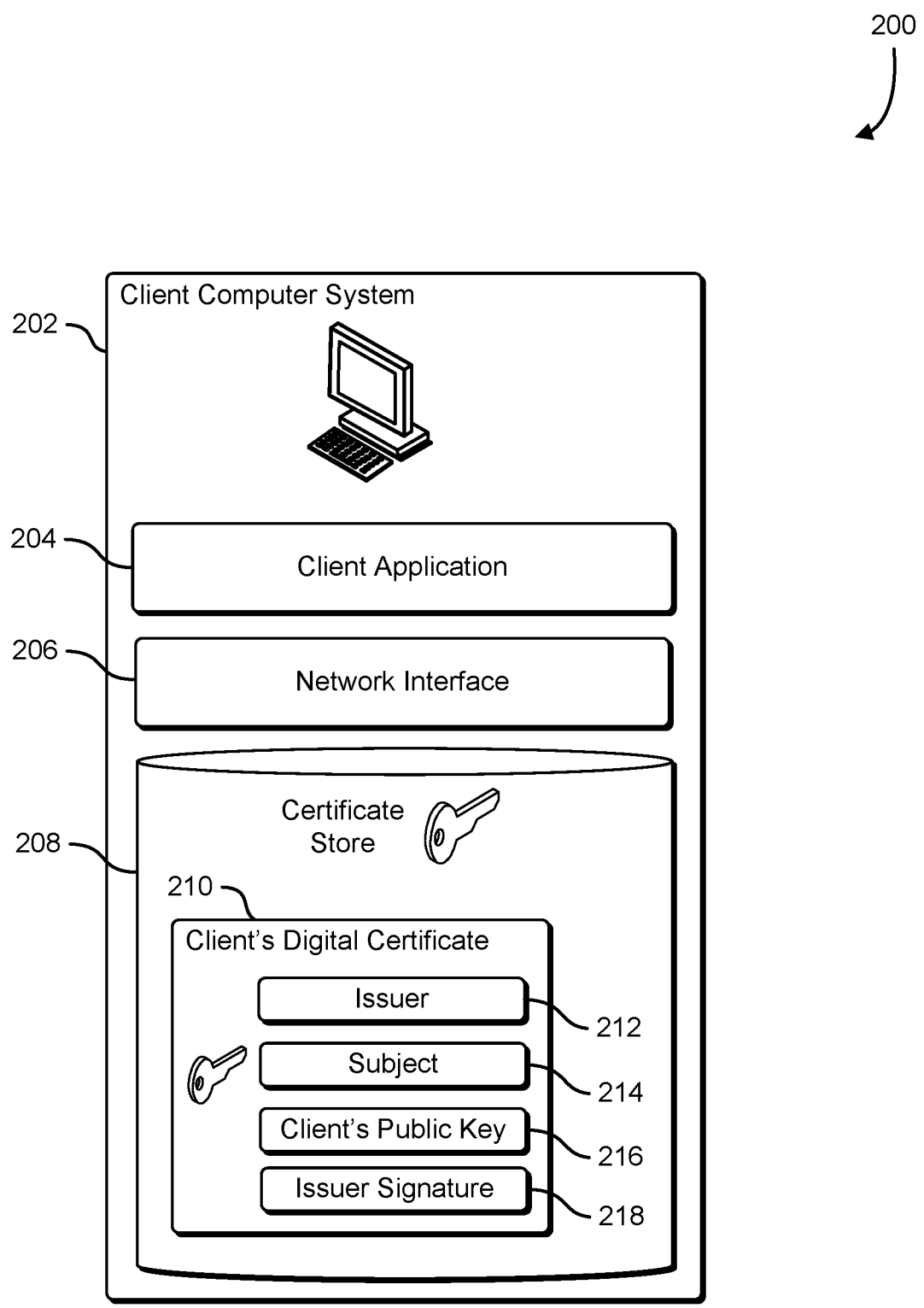
FIG. 2 shows an illustrative example of a client computer system that uses a digital certificate to access a remote service, according to one embodiment.

FIG. 2 shows an illustrative example of a client computer system that uses a digital certificate to access a remote service, according to one embodiment. A block diagram 200 shows a client computer system 202 that hosts a client application 204. The client computer system 202 may be a personal computer, laptop computer, mobile device, cellular device, network appliance, virtual computer system, or other computing environment. In various implementations, the client application 204 may be implemented as a standalone application, a service, or as a web application on a web browser. The client application 204 communicates with a corresponding server application via a network interface 206. In some examples, the network interface 206 is a wired interface such as an Ethernet interface, a USB interface, or a fiber-optic interface. In another example, the network interface 206 is a wireless interface such as a Wi-Fi interface, a cellular interface, or an infrared interface.

The client application 204 maintains a certificate store 208. The certificate store 208 is a database, data store, or other data structure used for retaining digital certificates used by the client application 204. The certificate store 208 is retained on a storage device that's accessible to the client computer system 202. In various implementations, the storage device may be an internal disk drive, a memory device, or an external storage service or device. The certificate store 208 retains a client digital certificate 210. The client digital certificate 210 includes an issuer field 212, a subject field 214, a public key 216 associated with the client, and an issuer signature 218. In some implementations, the client digital certificate 210 is an X.509 certificate. The issuer field 212 identifies an entity that signed the client digital certificate 210. In some examples, the issuer field 212 identifies a customer administrative entity such as a business that operates the client computer system 202. The subject field 214 identifies the client computer system 202 using a name, identifier, network address, or other information associated with the client computer system 202. The public key 216 is a public key for the client computer system 202. The client computer system 202 maintains possession of a private key corresponding to the public key 216. The issuer signature 218 is a digital signature of the client digital certificate 210 created using a private key associated with the issuer. In some examples, the issuer signature 218 is generated using a private key controlled by an administrator. The client digital certificate 210 may include other information such as additional signatures from various trusted entities or information describing various properties of the client computer system 202.

The client digital certificate 210 may be provided to the client computer system 202 in a variety of ways. In some implementations, the client computer system 202 generates an unsigned client digital certificate. The unsigned client digital certificate is provided to a certificate authority. The certificate authority verifies the information in the unsigned client digital certificate and confirms the identity of the client. If the identity of the client matches the information in the unsigned client digital certificate, the certificate authority adds a digital signature (issuer signature) to the unsigned digital certificate to produce the client digital certificate 210. The client digital certificate 210 is provided to the client computer system 202 by the certificate authority. In some examples, the administrator or administrative entity that is administrating the client computer system 202 acts as the certificate authority and signs the unsigned client digital certificate.

In another implementation, the client computer system 202 requests a client certificate from a system administrator. The system administrator generates the client certificate that includes identifying information for the client computer system and signs the client digital certificate using a private key controlled by the system administrator. The signed client digital certificate is provided to the client computer system 202, and the client computer system 202 stores the client digital certificate 210 in the certificate store 208. The system administrator uploads and administrative digital certificate to the service accessed by the client computer system 202. The administrative digital certificate contains a public key that corresponds to the private key that is used to sign the client digital certificate 210. When the client computer system 202 attempts to access the service, the client computer system 202 provides the client digital certificate 210 to the service, and the service verifies that the client digital certificate 210 is properly signed using the administrative digital certificate provided by the system administrator. If the client computer system 202 does not provide a properly signed client digital certificate, the client computer system 202 is denied access to the service.

Figure 3:
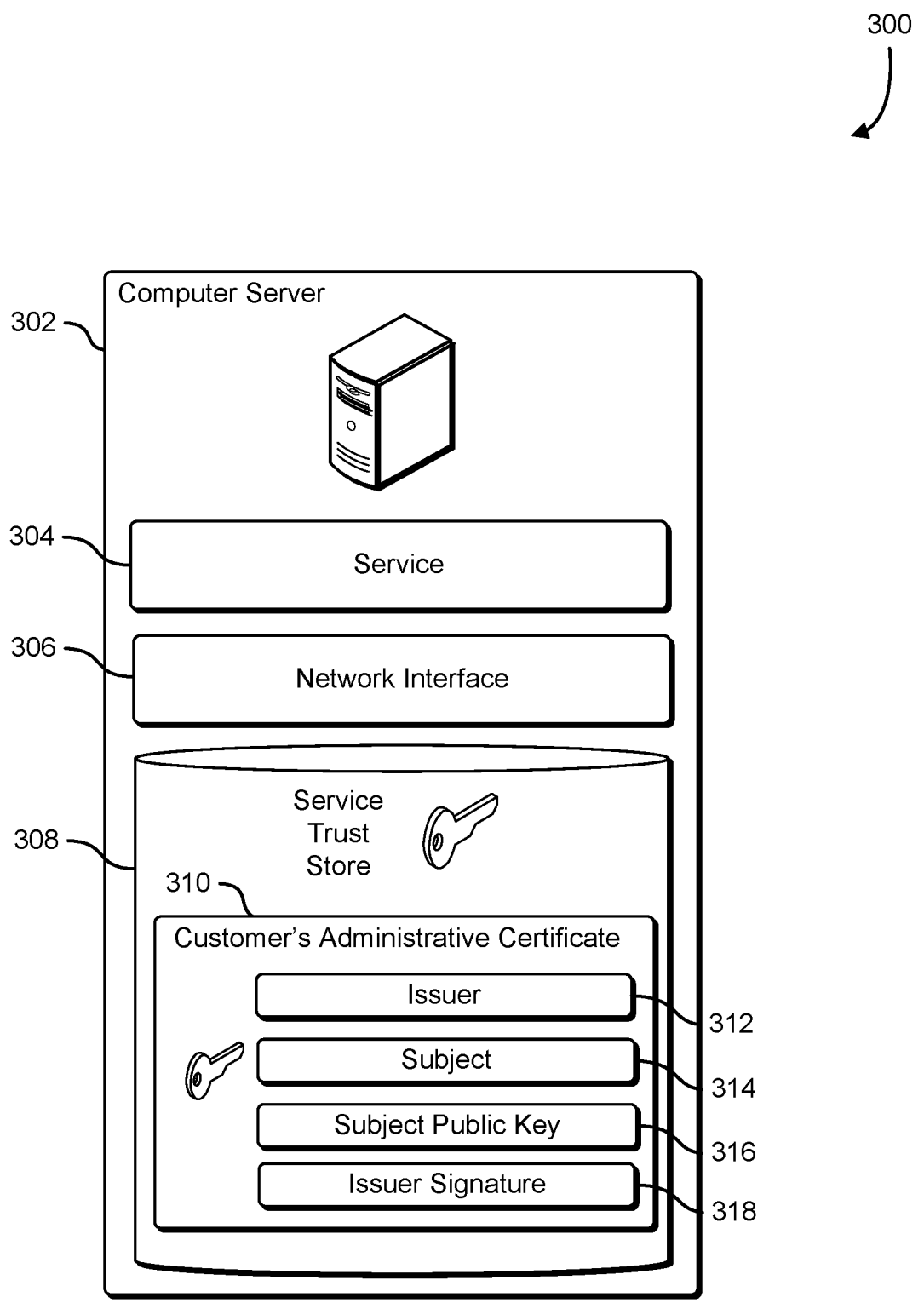
FIG. 3 shows an illustrative example of a computer server that controls access to a remote service using a collection of administrative certificates maintained in a trust store, according to one embodiment.

FIG. 3 shows an illustrative example of a computer server that controls access to a remote service using a collection of administrative certificates maintained in a trust store, according to one embodiment. A block diagram 300 shows a computer server 302 that hosts a service 304. The computer server 302 may be a personal computer, laptop computer, mobile device, cellular device, network appliance, virtual computer system, or other computing environment. In various implementations, the service 304 may be implemented as a Web service, a network service, a remote procedure call ("RPC"), or with any other network-accessible interface. The service 304 communicates with a client computer system running a corresponding client application via a network interface 306. In some examples, the network interface 306 is a wired interface such as an Ethernet interface, a USB interface, or a fiber-optic interface. In another example, the network interface 306 is a wireless interface such as a Wi-Fi interface, a cellular interface, or an infrared interface.

The service 304 maintains a service trust store 308. The service trust store 308 is a database, data store, or other data structure used for retaining digital certificates used by the service 304 when authorizing client computer systems. The service trust store 308 is retained on a storage device that is accessible to the computer server 302. In various implementations, the storage device may be an internal disk drive, a memory device, or an external storage service or device. The service trust store 308 retains an administrative certificate 310. The administrative certificate 310 includes an issuer field 312, a subject field 314, a public key 316 associated with the customer, and an issuer signature 318. In some implementations, the administrative certificate 310 is an X.509 certificate. The issuer field 312 identifies an entity that signed the administrative certificate 310. In some examples, the administrative certificate 310 is a self-signed certificate and the issuer field 312 identifies a customer administrative entity. In additional examples, the administrative certificate 310 is signed by a trusted third-party certificate authority. The subject field 314 identifies the customer administrative entity using a name, identifier, network address, or other information associated with the customer administrative entity. The public key 316 is a public key for the customer administrative entity. The customer administrative entity maintains control over a private key corresponding to the public key 316. The issuer signature 318 is a digital signature of the administrative certificate 310 created using a private key associated with the issuer. In some examples, the issuer signature 318 is generated using a private key controlled by a administrator. The administrative certificate 310 may include other information such as additional signatures from various trusted entities or information describing various properties of the computer server 302.

The administrative certificate 310 is provided to the computer server 302 by an administrator via an administrative console or administrative computer system. In some implementations, the administrator logs in via an administrative interface to the computer server 302 and uploads the administrative certificate 310 to the computer server 302. The service 304 confirms the authority of the administrator and stores the customer administrative service in the service trust store 308. In some implementations, the service 304 allows the administrator to upload more than one administrative certificate. For example, the administrator may upload a second certificate when a first certificate is near expiration. The service 304 maintains a record that links each administrative certificate to a particular account.

When a client computer system attempts to log in to the service 304, the service generates a challenge message that is submitted to the client computer system. The client computer system signs the challenge message with a private key that is associated with the client's digital certificate. The client computer system provides the client's digital certificate and the signature of the challenge message to the service. The service 304 uses the client's digital certificate to confirm the signature of the challenge message, and further confirms that the client's digital certificate is signed using a cryptographic key that is associated with at least one of the customer's administrative certificates in the service trust store 308.

For example, a particular administrator manages a set of clients. The administrator uploads client certificates to each client in the set of clients, and signs each client certificate for the particular administrator's private key. The particular administrator uploads, to the service 304, a customer digital certificate associated with the administrator's private key, and the service 304 stores the particular administrator's private key in the service trust store 308. The service 304 will allow the client in the set of clients to access the service 304 using the customer account associated with the particular administrator.

Figure 4:
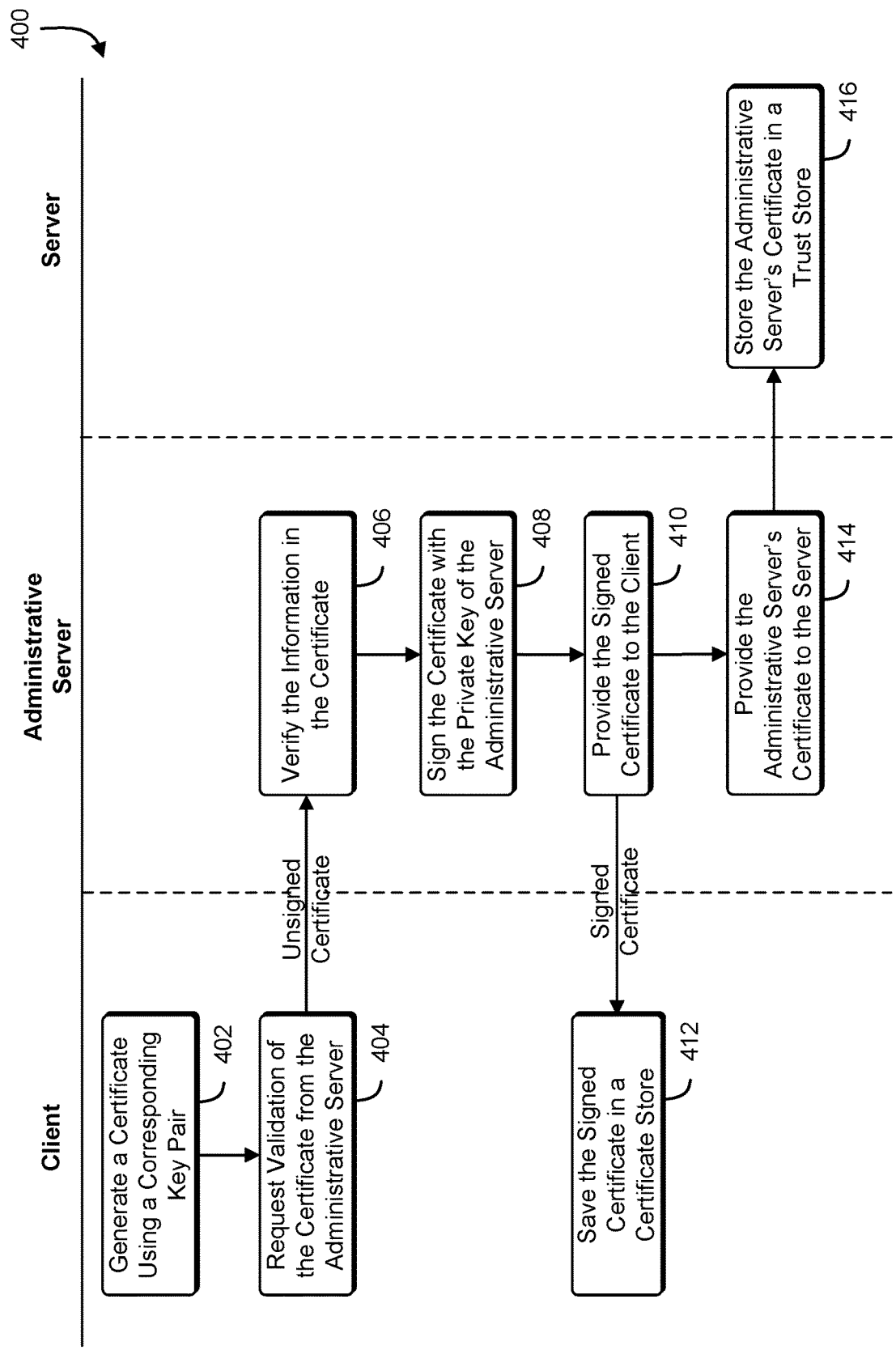
FIG. 4 shows an illustrative example of a process that, as a result of being performed by a client computer system, an administrative server, and a server computer system, configures a client computer system to access a service provided by the server computer system, according to one embodiment.

FIG. 4 shows an illustrative example of a process that, as a result of being performed by a client computer system, an administrative server, and a server computer system, provides digital certificates that allow a client computer system to access a service provided by the server computer system, according to one embodiment. A swim diagram 400 illustrates a process that begins at block 402 with a client computer system generating a client certificate. To generate the client certificate, the client computer system generates a public-private key pair. The client computer system retains the private key, and uses the public key to generate an unsigned digital certificate. The unsigned digital certificate includes identifying information that describes the client computer system and the public key.

At block 404, the client computer system requests validation of the unsigned digital certificate from the administrative server. At block 406, the administrative server receives the unsigned certificate from the client computer system and verifies the identifying information in the unsigned certificate. In some implementations, the administrative server contacts the responsible individual over another communication channel to confirm the certificate request. If the administrative service is not able to verify the identifying information in the unsigned certificate, the administrative server does not sign the unsigned certificate. If the administrative service successfully verifies that the identifying information in the unsigned certificate matches the identity of the client computer system, execution advances to block 408, and the administrative server signs the unsigned certificate using a private key associated with a digital certificate of the administrative server. The resulting signed client certificate is provided 410 to the client computer system. At block 412, the client computer system receives the signed client certificate and saves the signed client certificate in a certificate store for later use.

The administrative server provides the digital certificate of the administrative server to the server computer system so that the server computer system can verify the signed client certificate. At block 414, the administrative server logs into the server computer system and uploads, via an administrative interface, the administrative server's digital certificate. The server computer system receives the administrator's digital certificate and stores 416 the administrative server's certificate in a trust store. The server computer system maintains a record of the customer account that uploaded the administrative service digital certificate. In various implementations, client computer systems that attempt to access resources associated with the customer account that are maintained by the server computer system are required to provide a client certificate that is signed using a cryptographic key associated with the administrative service digital certificate. In this way, administrators are able to assert additional control over the set of clients that are able to access resources associated with the customer account. For example, if a particular user's laptop computer is lost, the administrator can replace the administrative service digital certificate on the server computer system with a new administrative service digital certificate, and issue new client certificates that are signed with the new administrative service digital certificate. In some implementations, an administrator is able to indicate to the server computer system that the client digital certificate associated with the lost laptop computer is revoked.

Figure 5:
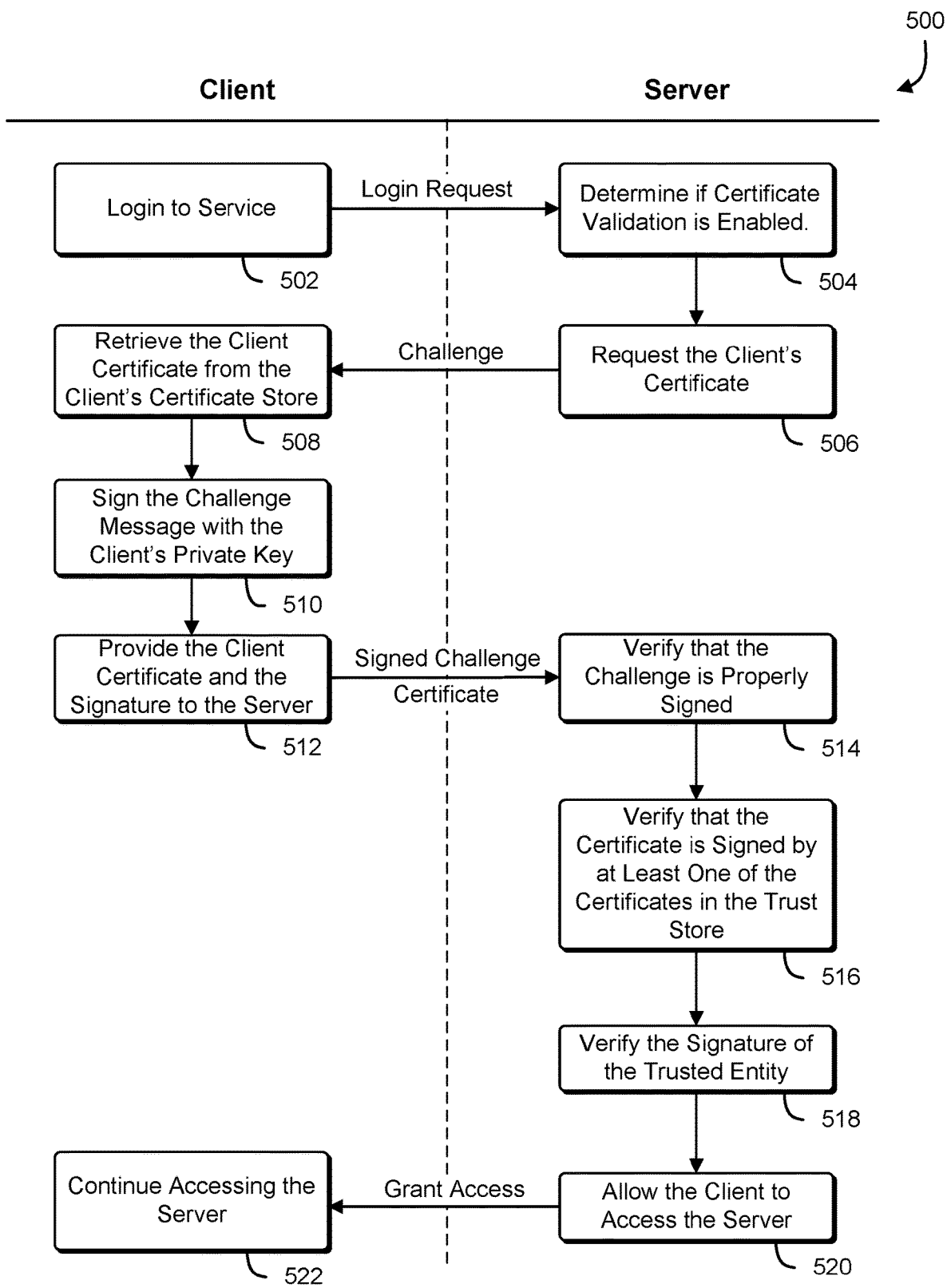
FIG. 5 shows an illustrative example of a process that, as a result of being performed by a client computer system and a server computer system, determines whether the client computer system is authorized to access the service provided by the server computer system, according to one embodiment.

FIG. 5 shows an illustrative example of a process that, as a result of being performed by a client computer system and a server computer system, determines whether the client computer system is authorized to access the service provided by the server computer system, according to one embodiment. A swim diagram 500 illustrates a process that begins at block 502 with a client computer system attempting to log in to a service provided by a server computer system. As part of attempting to log in to the service, the client identifies a particular customer account of the service. In some implementations, the client computer system provides credentials such as a username and password to the server computer system. In various examples, the particular customer account may be used by a plurality of client computer systems, and may be managed by an administrator. In another example, the client computer system requests access to the service using particular client credentials, and the particular client credentials are administered by a credential manager under the control of the administrative entity. Examples of a credential manager include Active Directory, Windows Credential Manager, Account manager, or password store.

At block 504, the server computer system receives the login request from the client computer system. The server computer system determines whether client certificate validation is enabled for the particular customer account. In some implementations, a administrator for the particular customer account accesses an administrative interface provided by the server computer system to enable or disable client certificate validation. If client certificate validation is not enabled, the server computer system uses the credentials provided by the client computer system to determine whether the client computer system is allowed to access the service provided by the computer server system. If client certificate validation is enabled, execution advances to block 506 and the server computer system requests a digital certificate from a client computer system. The server computer system sends a challenge message to the client computer system. The challenge message may be a piece of data randomly generated by the server computer system. In some implementations, the client computer system generates a random piece of data which is sent to the server computer system and added to the challenge message. In yet another implementation, the server computer system generates a nonce that is provided to the client computer system as a challenge message.

At block 508, the client computer system receives the challenge message and retrieves, from the client certificate store, the client's digital certificate. The client's digital certificate includes a public key associated with the client computer system and the client computer system retrieves a corresponding private key. At block 510, the client computer system uses the private key corresponding to the client's digital certificate to sign the challenge message. In some examples, a digital signature is generated of the challenge message using the RSA algorithm. At block 512, the client computer system provides the signature of the challenge message and the client's digital certificate to the server computer system.

The server computer system receives the digital signature of the challenge message and the client's digital certificate at block 514 and verifies that the signature of the challenge message is correct using the public key contained within the client's digital certificate. If the signature of the challenge message is incorrect, the client computer system is not allowed to access the service hosted by the server computer system. If the signature of the challenge message is correct, the server computer system verifies 516 that the client's digital certificate is signed by at least one trusted digital certificate uploaded to the server computer system by the administrator. In some implementations, the server computer system examines the trust chain of the client digital certificate and determines whether at least one entity in the trust chain matches an entity associated with one of the trusted digital certificates. At block 518, the server computer system verifies the signature associated with the trusted digital certificate. In one implementation, the server computer system validates the digital signature on the client digital certificate using the public keys of the corresponding trusted digital certificate. If the client's digital certificate is not properly signed with a private key associated with a trusted digital certificate uploaded by an administrator (or other responsible entity), the client computer system is not allowed to access the service hosted by the server computer system. If the client's digital certificate is properly signed by an entity associated with a trusted digital certificate, execution advances to block 520, and the client computer system is allowed to access the service hosted by the server computer system.

The server computer system indicates to the client computer system that access to the service has been granted. At block 522, the client computer system receives the indication and is able to access the service by, for example, sending commands, receiving information, or requesting other operations be performed by the service.

Figure 6:
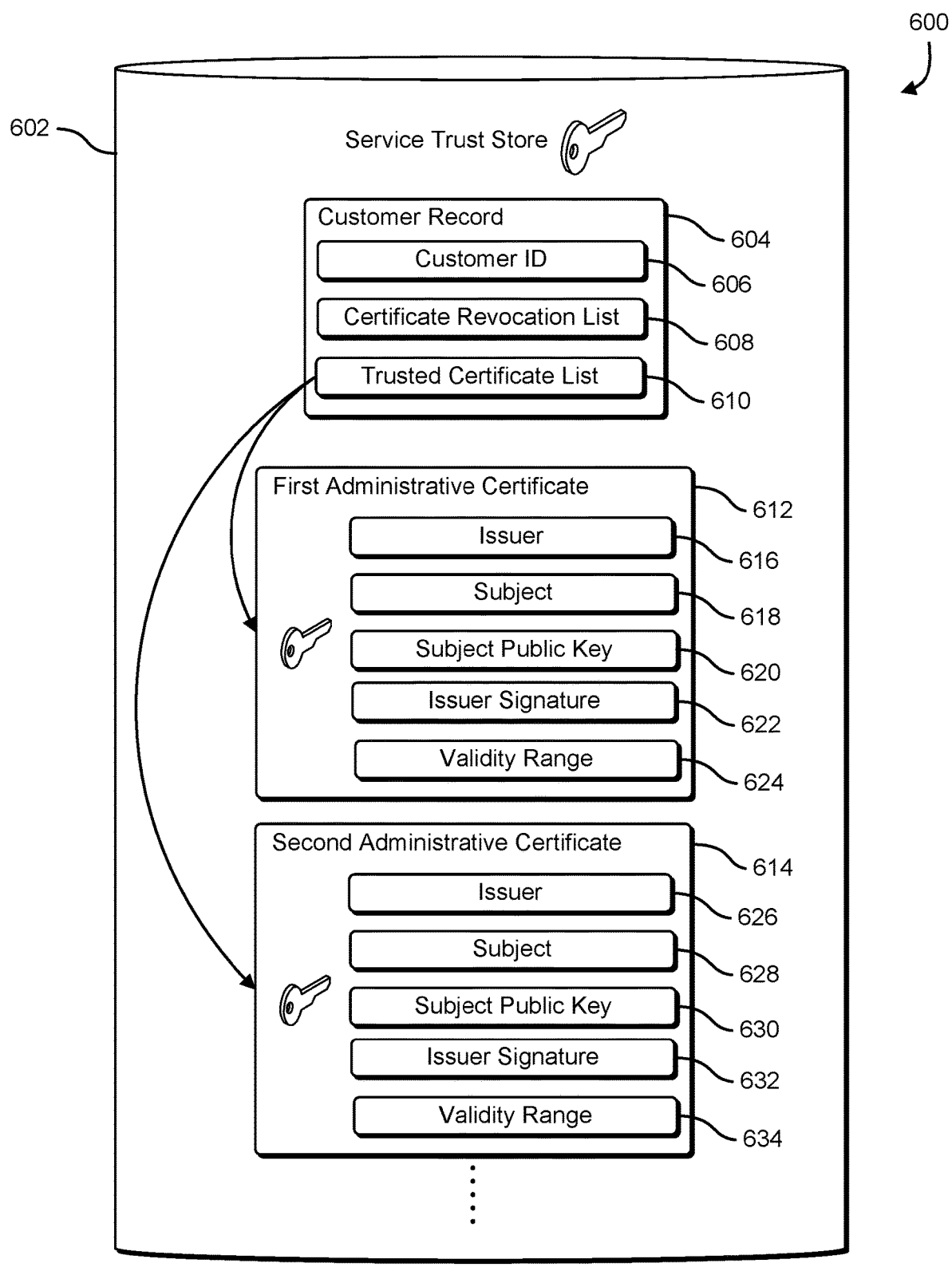
FIG. 6 shows an illustrative example of a trust store that retains a collection of administrative certificates which control access to a remote service, according to one embodiment.

FIG. 6 shows an illustrative example of a trust store that retains a collection of administrative certificates which control access to a service, according to one embodiment. A block diagram 600 shows a service trust store 602. The service trust store 602 may be implemented as a database, data store, or other data structure on a storage device that is accessible to a server computer system. The service trust store 602 retains a collection of customer records. A particular customer record 604 includes a customer ID field 606, a certificate revocation list 608, and a trusted certificate list 610. The customer ID field 606 contains information that identifies a particular customer account of the service. In various examples, the customer ID field 606 may contain a username, a customer identifier, or an account number. The certificate revocation list 608 includes or references a number of client digital certificates that have been revoked. In various implementations, the client digital certificates that are present in the certificate revocation list 608 may not be used to access the service. The trusted certificate list 610 references a set of trusted certificates that may be used to identify valid client digital certificates that may be used access the service. The set of trusted certificates may include one or more digital certificates that are uploaded to the service and stored in the service trust store 602 by an administrator.

The trusted certificate list 610 may be implemented using an array, linked list, or other data structure that references a set of trusted digital certificates. In the example shown in FIG. 6, the trusted certificate list 610 references a first administrative certificate 612 and a second administrative certificate 614. In various other examples, the trusted certificate list 610 may reference zero, one, or more digital certificates. The first administrative certificate 612 includes an issuer field 616, a subject field 618, subject public key 620, an issuer signature 622, and a validity range 624. The issuer field 616 includes information that identifies an entity that issued the first administrative certificate 612. In some examples, the issuer field 616 references more than one entity. The subject field 618 describes the entity that controls the private key associated with the subject of the first administrative certificate 612. The subject public key 620 contains the public key associated with the subject of the first administrative certificate 612. The issuer signature 622 contains a digital signature generated by the issuer of the first administrative certificate 612. In some examples, the first administrative certificate 612 may include a plurality of signatures. The validity range 624 includes information that describes a range of time during which the first administrative certificate 612 is valid. In various implementations, the service may require that client certificates be signed by a trusted digital certificate, and that the trusted digital certificate be valid in accordance with the validity range 624.

The second administrative certificate 614 includes an issuer field 626, a subject field 628, subject public key 630, an issuer signature 632, and a validity range 634. The issuer field 626 includes information that identifies an entity that issued the second administrative certificate 614. In some examples, the issuer field 626 references more than one entity. The subject field 628 describes the entity that controls the private key associated with the subject of the second administrative certificate 614. The subject public key 630 contains the public key associated with the subject of the second administrative certificate 614. The issuer signature 632 contains a digital signature generated by the issuer of the second administrative certificate 614. In some examples, the second administrative certificate 614 may include a plurality of signatures. The validity range 634 includes information that describes a range of time during which the second administrative certificate 614 is valid. In various implementations, the service may require that client certificates be signed by a trusted digital certificate, and that the trusted digital certificate be valid in accordance with the validity range 634.

Figure 7:
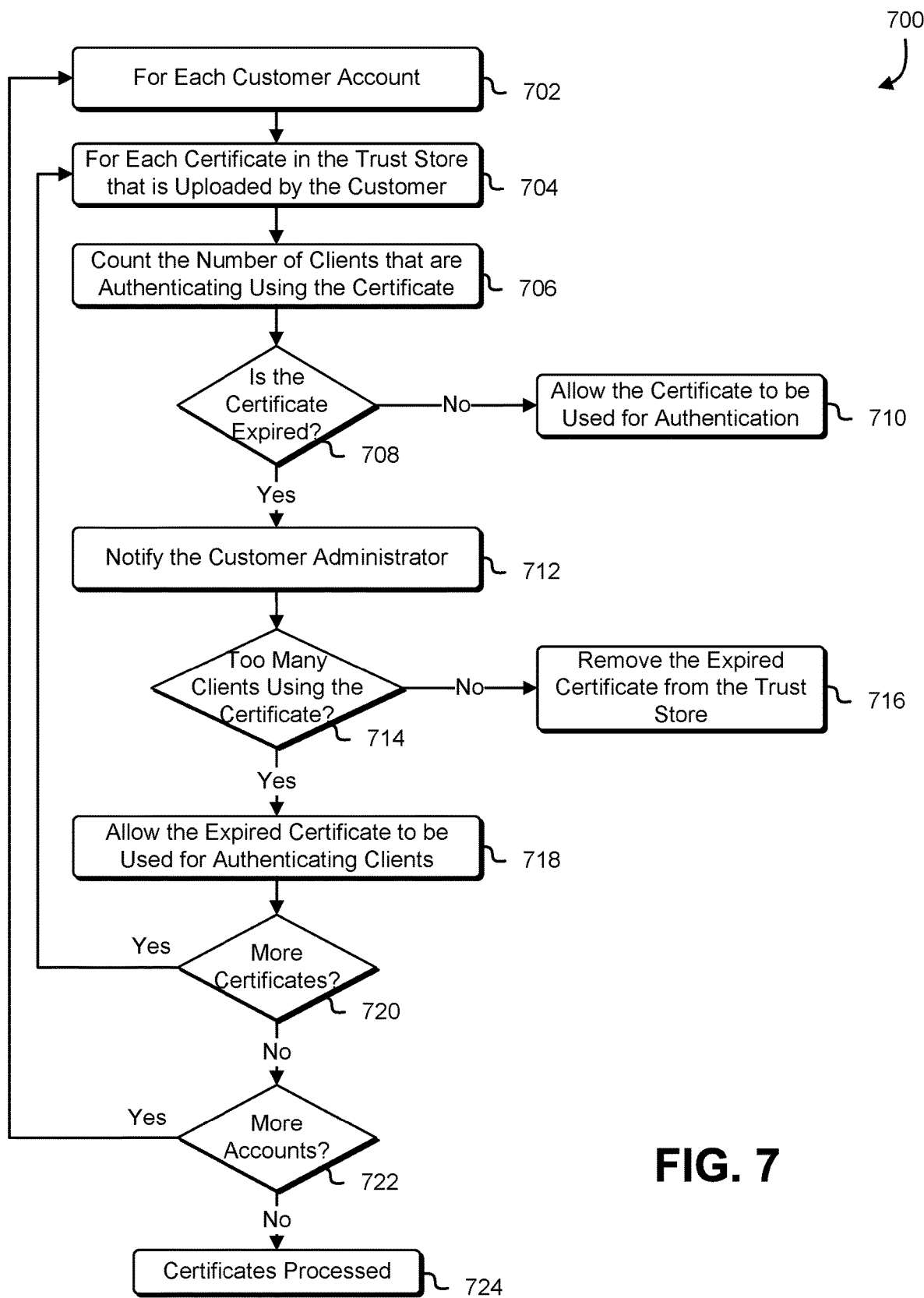
FIG. 7 shows an illustrative example of a process that, as a result of being performed by a server computer system, manages the expiration of a trusted root certificate, according to one embodiment.

FIG. 7 shows an illustrative example of a process that, as a result of being performed by a server computer system, manages the expiration of a trusted root certificate, according to one embodiment. A flowchart 700 illustrates a process that begins at block 702 with a server computer system iterating over a set of customer accounts. Each customer account in the set of customer accounts is managed by a corresponding administrator. A number of client computer systems that are managed by the administrator are able to access the service using credentials associated with the customer account. At block 704, the server computer system iterates over each trusted digital certificate that is associated with the iterated customer account.

At block 706, the server computer system determines a number of client computer systems that are accessing the service using a client digital certificate that is verifiable using the iterated trusted digital certificate. In some implementations, the server computer system determines the number of client computer systems that are accessing the service using the iterated trusted digital certificate by maintaining a list of unique client computer systems that access the service using a client digital certificate that is verifiable using the iterated trusted digital certificate. If a particular client computer system does not access the service for a threshold amount of time, the particular client computer system is removed from the list. If a particular client computer system accesses the service using a client digital certificate signed from a different trusted digital certificate, the particular client computer system is removed from the list. The number of client computer systems actively using a particular trusted digital certificate is the number of entries in the list.

At decision block 708, the server computer system determines whether the iterated trusted digital certificate is expired by examining expiration information included with the trusted digital certificate. If the iterated trusted digital certificate is not expired, execution advances to block 710 and the server computer system allows the iterated trusted digital certificate to be used in authenticating client digital certificates. If the iterated trusted digital certificate is expired, execution advances to block 712. At block 712, the server computer system notifies the administrator that the iterated trusted digital certificate is expired. In some implementations, the server computer system notifies clients whose client digital certificates are signed using the iterated trusted digital certificate that the iterated trusted digital certificate is expired.

At decision block 714, the server computer system compares the number of client computer systems using the iterated trusted digital certificate to a threshold value (determined at block 706). If the number of client computer systems does not exceed a threshold value, execution advances to block 716 and the expired iterated trusted digital certificate is removed from the trust store maintained by the service. If the number of client computer systems does exceed the threshold value, execution advances to block 718 and the server computer system allows the expired iterated trusted digital certificate to continue to be used when authorizing client computer systems to access the service. The threshold value may be an absolute number of client computer systems or a fraction of computer systems managed by the administrator. The threshold value may be determined as a number of client computer systems that the administrator can tolerate losing access to the service while the corresponding client digital certificates are updated.

At decision block 720, the server computer system determines whether there are more certificates associated with the service account. If there are more certificates associated with the service account, execution returns to block 704 and the next trusted digital certificate is processed. If there are not more certificates associated with the service account, execution advances to decision block 722. At decision block 722, the computer system determines whether there are more customer accounts to be iterated. If there are more customer accounts to be iterated, execution returns to block 702 and the next customer account is processed. If there are no more customer accounts to be processed, execution advances to block 724. At block 724, expiration processing of the certificates in the trust store is complete.

Figure 8:
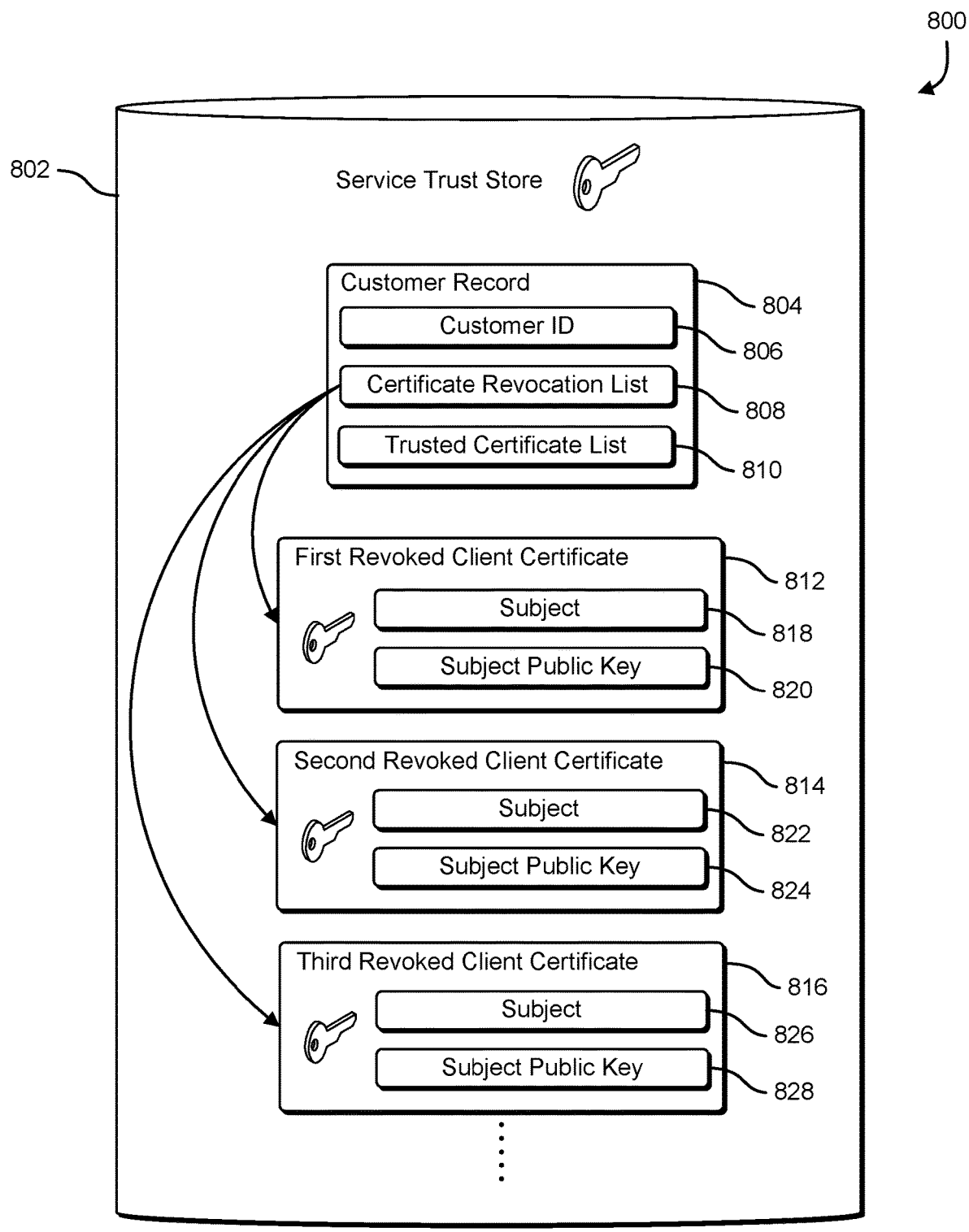
FIG. 8 shows an illustrative example of a trust store that includes a list of revoked certificates that may no longer be used to access a service provided by a computer server, according to one embodiment.

FIG. 8 shows an illustrative example of a trust store that includes a list of revoked certificates that may no longer be used to access a service provided by a computer server, according to one embodiment. A block diagram 800 shows a service trust store 802. The service trust store 802 may be implemented as a database, data store, or other data structure on a storage device that is accessible to a server computer system. The service trust store 802 retains a collection of customer records. A particular customer record 804 includes a customer ID field 806, a certificate revocation list 808, and a trusted certificate list 810. The customer ID field 806 contains information that identifies a particular customer account of the service. In various examples, the customer ID field 806 may contain a username, a customer identifier, or an account number. The certificate revocation list 808 includes or references a number of client digital certificates that have been revoked. In various implementations, the client digital certificates that are present in the certificate revocation list 808 may not be used to access the service. The trusted certificate list 810 references a set of trusted certificates that may be used to identify valid client digital certificates that may be used to access the service. The trusted certificate list 810 may be implemented using an array, linked list, or other data structure that references a set of trusted digital certificates. The set of trusted certificates may include one or more digital certificates that are uploaded to the service and stored in the service trust store 802 by a administrator.

In the example shown in FIG. 8, the certificate revocation list 808 references a first revoked client certificate 812, the second revoked client certificate 814, and a third revoked client certificate 816. Each revoked certificate record identifies the subject of the revoked certificate and the public key of the revoked certificate. The first revoked client certificate 812 includes a subject field 818 and a subject public key field 820. The second revoked client certificate includes a subject field 822 and a subject public key 824. The third revoked client certificate 816 includes a subject field 826 and a subject public key 828. Each subject field contains information that identifies the subject of the revoked digital certificate, and each subject public key field holds a copy of the public key associated with the revoked certificate. When a certificate is revoked, the server computer system adds a new revoked certificate record to the certificate revocation list 808 and sets the subject field and the subject public key field of the new revoked certificate record to the corresponding information in the revoked client certificate. If a revoked certificate is reinstated, the revoked certificate record corresponding to the revoked certificate may be removed from the certificate revocation list 808.

Figure 9:
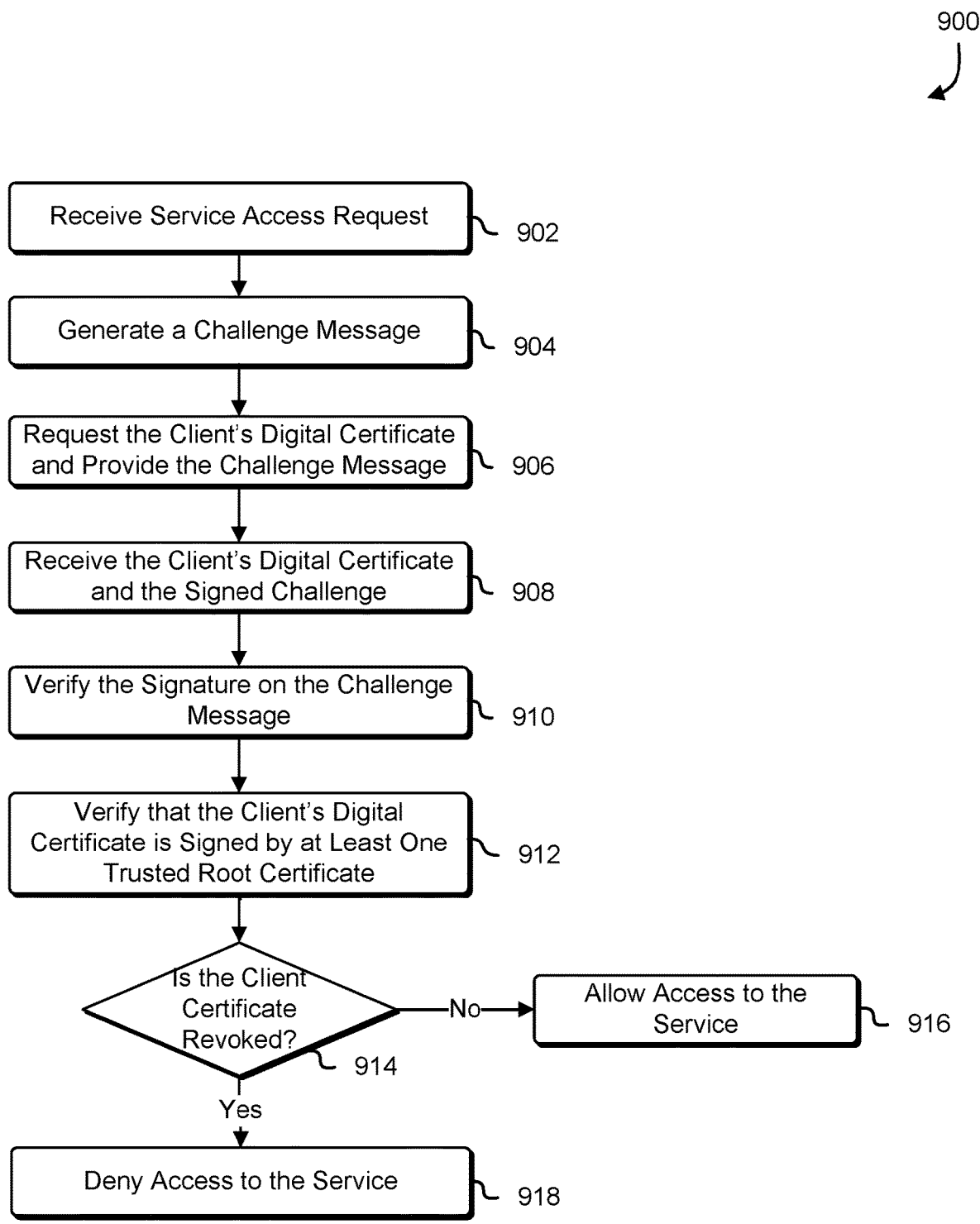
FIG. 9 shows an illustrative example of a process that, as a result of being performed by a server computer system, determines whether a client certificate is revoked, according to one embodiment.

FIG. 9 shows an illustrative example of a process that, as a result of being performed by a server computer system, determines whether a client computer system is allowed to access the service provided by the server computer system, according to one embodiment. A flowchart 900 illustrates a process that begins at block 902 with a server computer system receiving a request from a client computer system to access the service provided by the server computer system. In various examples, the request may be received over a web interface, a remote procedure call interface, or a messaging interface. At block 904, the server computer system generates a challenge message. The challenge message is a randomly generated data stream that, when signed by the client computer system, proves that the client computer system is in possession of a private key corresponding to a public key and the client's digital certificate. At block 906, the server computer system sends a challenge message to the client computer system and requests the client's digital certificate.

In response, the server computer system receives 908 the client's digital certificate and a digital signature of the challenge message. In some implementations, the client computer system adds material to the challenge message and returns the modified challenge message to the server computer system. At block 910, the server computer system verifies the signature on the challenge message using the public key in the client's digital certificate. If the signature on the challenge message is not correct, the server computer system determines that the identity of the client computer system does not match the client's digital certificate and does not allow the client computer system to access the service hosted by the server computer system.

At block 912, the server computer system verifies that the client's digital certificate is signed by at least one digital certificate that is trusted by the administrator. The administrator uploads the set of trusted digital certificates to the service, and the service stores the trusted digital certificates in a trust store for the administrator. To verify that the client's digital certificate is signed by a trusted entity, the server computer system verifies the issuer signature on the client's digital certificate using the trusted certificates uploaded by the administrator. If the client digital certificate is able to be verified using at least one of the trusted digital certificates, execution advances to decision block 914. If the client digital certificate cannot be verified using at least one of the trusted digital certificates, the server computer system does not allow the client computer system to access the service.

At decision block 914, the server computer system determines whether the client digital certificate is revoked by examining a certificate revocation list maintained by the service. If the client digital certificate is not represented in the certificate revocation list, execution advances to block 916 and the client computer system is allowed to access the service on the server computer system. If the client digital certificate is represented in the certificate revocation list, execution advances to block 918 and the client computer system is denied access to the service on the server computer system.

Figure 10:
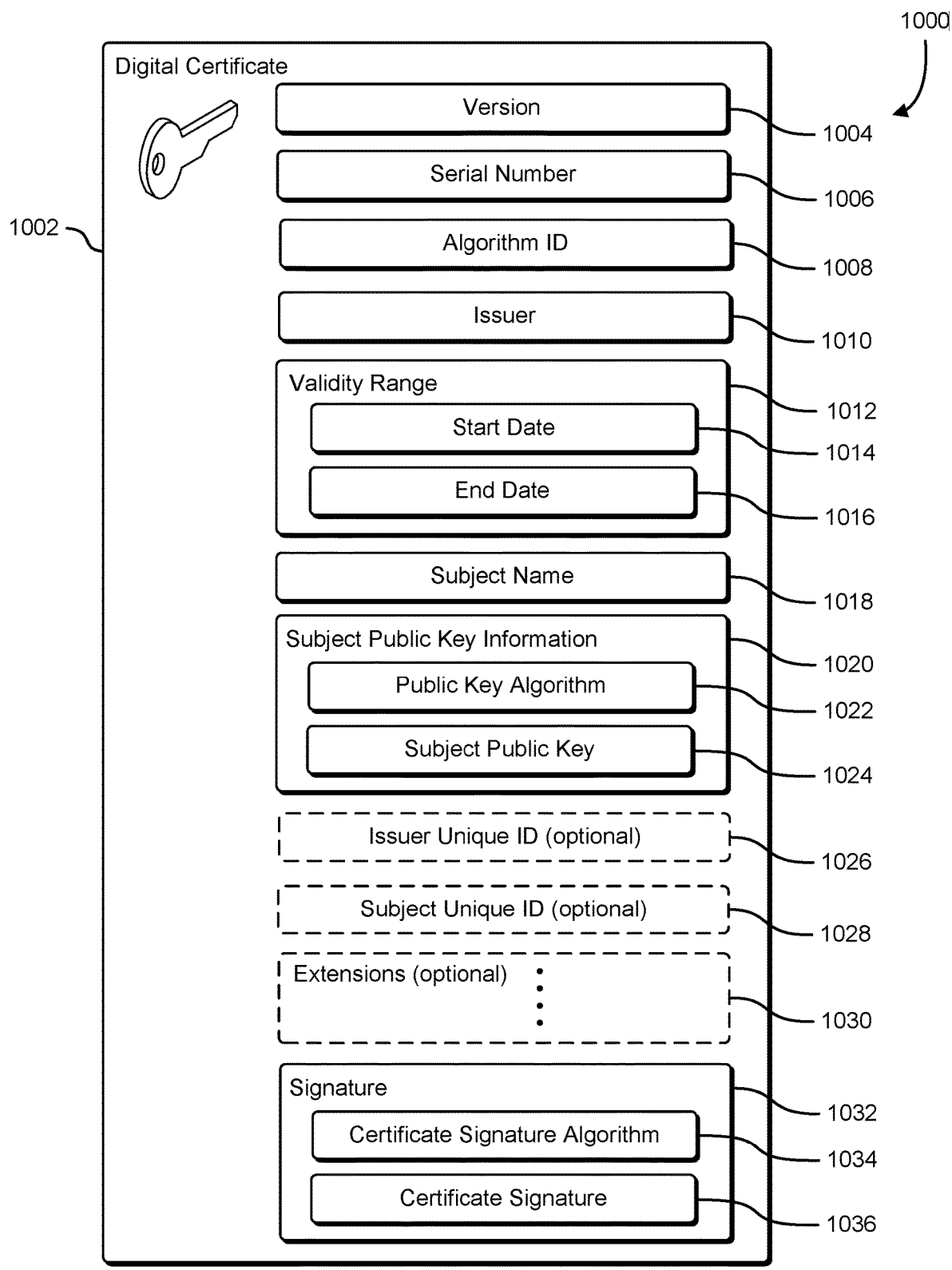
FIG. 10 shows an illustrative example of a digital certificate, according to one embodiment.

FIG. 10 shows an illustrative example of a digital certificate, according to one embodiment. A data diagram 1000 illustrates how information may be organized in a digital certificate. A digital certificate 1002 includes a version 1004, a serial number 1006, an algorithm ID 1008, and an issuer 1010. The version 1004 identifies a schema for the information maintained in the digital certificate 1002. The serial number 1006 is a unique number that identifies the digital certificate 1002. The algorithm ID 1008 identifies a cryptographic algorithm used to generate digital signatures in the digital certificate 1002. The issuer 1010 identifies a certificate authority or other entity that issued the digital certificate 1002 to the subject of the digital certificate.

The digital certificate 1002 includes validity range 1012. The validity range 1012 includes a start date 1014 and an end date 1016. The start date 1014 and the end date 1016 define an interval of time over which the certificate is valid, according to the issuer of the certificate. A subject name 1018 contains information that identifies the subject of the digital certificate 1002. The digital certificate 1002 includes a block of subject public key information 1020. The block of subject public key information 1020 includes a public key algorithm 1022 and the subject public key 1024. The public key algorithm 1022 defines the algorithm with which the subject public key 1024 is compatible. The subject public key 1024 describes a public key associated with the subject. The subject maintains control over a private key corresponding to the public key.

The digital certificate 1002 may include a number of optional features. In some examples, the digital certificate 1002 includes an issuer ID 1026, a subject ID 1028, and one or more certificate extensions 1030. Certificate extensions 1030 may include a variety of information, some of which may be verified by the issuer of the certificate. The digital certificate 1002 includes a digital signature 1032. The digital signature 1032 includes a certificate signature algorithm 1034 and a certificate signature 1036. The certificate signature algorithm 1034 describes the algorithm used by the issuer to sign the digital certificate 1002. The certificate signature 1036 is the signature of the digital certificate 1002 generated by the issuer or certificate authority.

Figure 11:
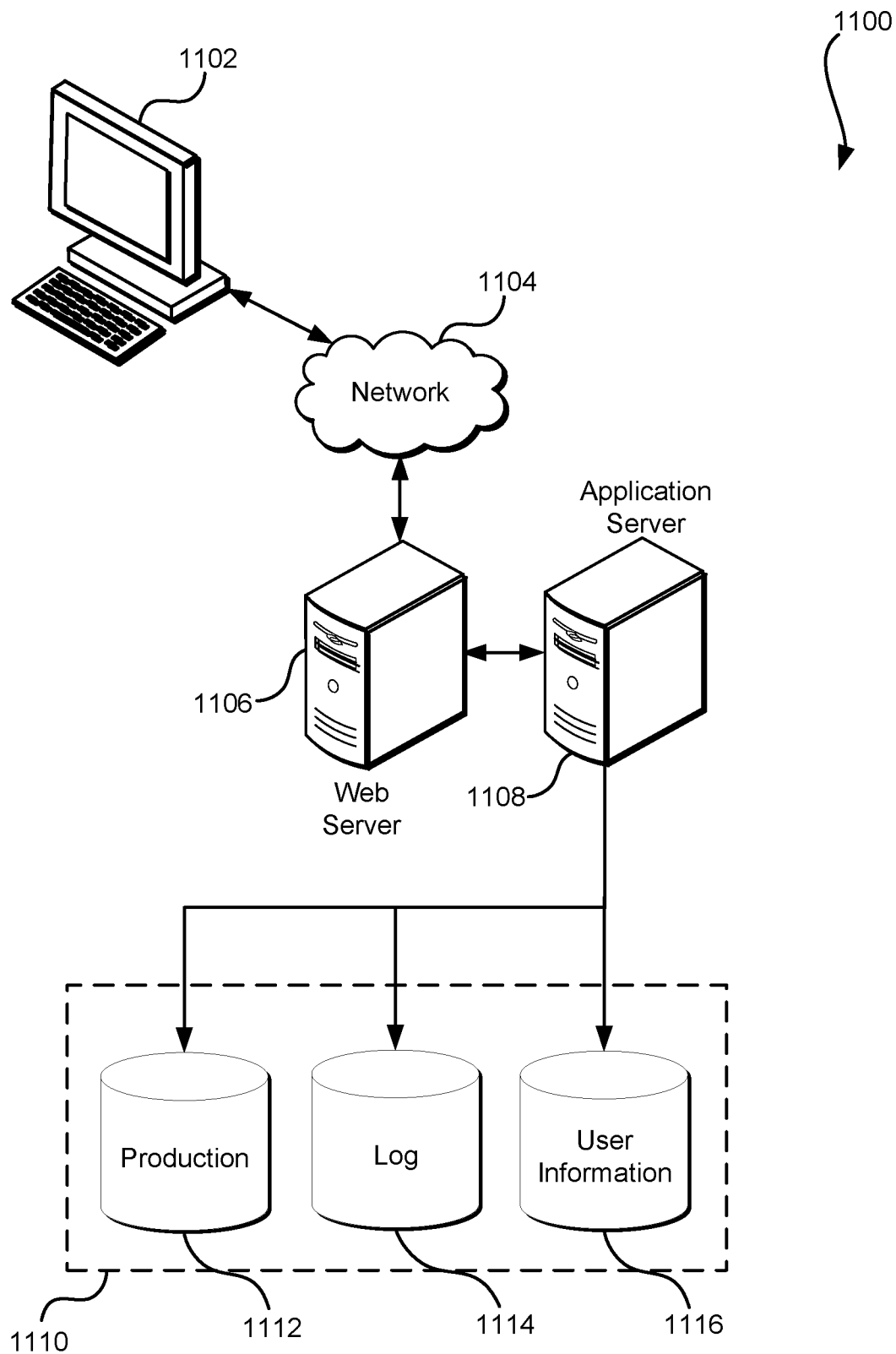
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes, and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

Example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode.

As discussed, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include the advanced encryption standard (AES), the data encryption standard (DES), triple DES (3DES), Serpent, Twofish, blowfish, CASTS, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA), and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs)), keyed cryptographic hash functions, and other types of information may also be used as digital signatures.

It should be noted that the phrase "one-way function" includes functions that are not necessarily one-way in the strict mathematical sense, but that exhibit properties (such as, collision resistance, preimage resistance, and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.), and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold), and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). For example, an encryption operation is one-way to entities that do not have the decryption key. In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

In various embodiments, data objects such as digital certificates or digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   authenticating an administrative entity that is associated with a customer account;
   acquiring a trusted digital certificate from the administrative entity, the trusted digital certificate including a public key and a private key;
   storing the public key of the trusted digital certificate in association with the customer account such that the public key is used to authenticate one or more requests associated with the customer account, the trusted digital certificate included in a trusted certificate list including information indicating one or more trusted digital certificates used in authenticating requests obtained from one or more entities associated with the one or more trusted digital certificates;
   receiving, from a client computer system, a request to access a virtual desktop service, the request including an indication of association with the customer account and a signed challenge generated by the client computer system by at least signing data with the private key, where the indication of association with the customer account indicates at least in part the trusted digital certificate of the trusted certificate list;
   generating a determination to allow the client computer system access to the virtual desktop service by at least determining that the signed challenge is signed using the private key associated with the public key, that the trusted digital certificate associated with the private key has expired, and that a usage-based limit associated with a number of client computer systems using the trusted digital certificate which has expired has exceeded a threshold value; and
   allowing the client computer system to access the virtual desktop service using the customer account based at least in part on the determination.

2. The computer-implemented method of claim 1, further comprising:
   generating a challenge message; and
   providing the challenge message to the client computer system.

3. The computer-implemented method of claim 1, further comprising:
   acquiring a set of revoked digital certificates from the administrative entity;
   storing the set of revoked digital certificates in a revocation list; and
   determining that the trusted digital certificate received from the client computer system is not represented in the revocation list.

4. The computer-implemented method of claim 1, wherein the request to access the virtual desktop service is generated as part of a log-on operation performed by the client computer system.

5. A system, comprising:
   one or more processors; and
   memory that stores computer-executable instructions that, if executed, cause the system to:
      receive a digital signature generated by an entity, the digital signature generated using a private key associated with the entity;
      obtain, from a storage device, a digital certificate associated with the entity and a customer account, where the digital certificate is included in a list of trusted digital certificates indicating a set of trusted digital certificates that may be used to authenticate entities, the digital certificate including a public key that corresponds to the private key and the digital certificate provided by an administrative computer system associated with the customer account;
      verify the digital signature using the public key associated with the digital certificate by at least generating a determination that the digital certificate has expired and a first quantity of client computer systems authorized to use a resource of the customer account using the digital certificate which has expired has exceeded a threshold value; and
      allow the entity to access the resource of the customer account based at least in part on verifying the digital signature using the public key, inclusion of the digital certificate in the list of trusted digital certificates, and the determination.

6. The system of claim 5, wherein:
the digital certificate is one of a plurality of trusted digital certificates associated with the customer account included in the list of trusted digital certificates;
the private key is one of a plurality of trusted private keys; and
wherein the memory further includes computer-executable instructions that, if executed, cause the system to verify that the digital certificate is signed using at least one trusted private key of the plurality of trusted private keys.

7. The system of claim 6, wherein the computer-executable instructions cause the system to further:
retain the plurality of trusted digital certificates in the list of trusted digital certificates;
identify an expired digital certificate in the plurality of trusted digital certificates; and
remove the expired digital certificate.

8. The system of claim 6, wherein the computer-executable instructions cause the system to further:
identify a second digital certificate in the plurality of trusted digital certificates that has expired;
determine a second quantity of client computer systems that have been authorized to use the resource based at least in part on the second digital certificate; and
remove the second digital certificate from the plurality of trusted digital certificates as a result of the second quantity being within a value relative to the threshold value.

9. The system of claim 5, wherein the computer-executable instructions cause the system to further:
maintain a list of revoked client certificates; and
verify that the digital certificate is not in the list of revoked client certificates as a condition of allowing the entity to access the resource.

10. The system of claim 5, wherein:
the computer-executable instructions cause the system to further provide a challenge message to the entity; and
the digital signature is a cryptographic signature of data based at least in part on the challenge message.

11. The system of claim 5, wherein:
the digital certificate is signed by the administrative computer system associated with the customer account; and
the digital certificate is a self-signed certificate.

12. The system of claim 11, wherein the digital certificate is an x.509 certificate.

13. A non-transitory computer-readable storage medium storing thereon executable instructions that, as a result of being executed by one or more processors of a computer system, cause the computer system to at least:
provide a request to access a computing resource of a service provider computer system, the request associated with a customer account of a service provided by the service provider computer system;
receive a challenge message;
generate a challenge response based at least in part on information received in the challenge message, the challenge response including a cryptographic digital signature of the challenge message generated using a private key associated with the computer system;
provide the challenge response and a digital certificate associated with the computer system to the service provider computer system, the digital certificate including a public key that corresponds to the private key, and the digital certificate signed by an administrative entity associated with the customer account and included in a list of trusted digital certificates maintained by the service provider computer system; and
obtain access to the computing resource based at least in part on the service provider computer system verifying the challenge response and generating a determination that the digital certificate associated with the private key has expired and a number of computer systems, of which the computer system is a member, using the digital certificate which has expired exceeds a threshold value.

14. The non-transitory computer-readable storage medium of claim 13, wherein the challenge response is generated based at least in part on a combination of information received from the service provider computer system and a value generated by the computer system.

15. The non-transitory computer-readable storage medium of claim 13, wherein the cryptographic digital signature is generated in accordance with an RSA-algorithm, an ECDSA algorithm, an Edwards-curve Digital Signature Algorithm, or a Rabin signature algorithm.

16. The non-transitory computer-readable storage medium of claim 13, wherein the instructions further comprise instructions that, as a result of being executed by the one or more processors, cause the computer system to:
receive, from the service, an indication that the digital certificate is about to expire; and
request a renewed digital certificate from the administrative entity associated with the customer account.

17. The non-transitory computer-readable storage medium of claim 13, wherein the instructions further comprise instructions that, as a result of being executed by the one or more processors, cause the computer system to:
request access to the service using particular client credentials associated with the customer account, the particular client credentials controlled by a credential manager under control of the administrative entity.

18. The non-transitory computer-readable storage medium of claim 17, wherein the instructions further comprise instructions that, as a result of being executed by the one or more processors, cause the computer system to:
acquire the digital certificate from an administrative computer system operated by the administrative entity; and
store the digital certificate in a certificate store on the computer system.

19. The non-transitory computer-readable storage medium of claim 18, wherein the instructions further comprise instructions that, as a result of being executed by the one or more processors, cause the computer system to:
generate an unsigned digital certificate containing information that identifies the computer system;
provide the unsigned digital certificate to the administrative computer system;
cause the administrative computer system to sign the unsigned digital certificate using a cryptographic key associated with the administrative entity to produce a signed digital certificate;
receive the signed digital certificate from the administrative computer system; and
wherein the instructions that cause the computer system to provide the challenge response and the digital certificate further comprise instructions that, as a result of being executed by the one or more processors, cause the computer system to provide the challenge response and the signed digital certificate.

20. The non-transitory computer-readable storage medium of claim 19, wherein:

the public key and the private key are a public/private key pair generated by the computer system;
the unsigned digital certificate includes the public key; and
the private key is stored by the computer system in association with the digital certificate.

* * * * *